US011953914B2

(12) United States Patent
Ghannam et al.

(10) Patent No.: US 11,953,914 B2
(45) Date of Patent: Apr. 9, 2024

(54) SYSTEMS AND METHODS FOR VEHICLE PLATOONING

(71) Applicant: Ford Global Technologies, LLC, Dearborn, MI (US)

(72) Inventors: Mahmoud Yousef Ghannam, Canton, MI (US); Brian Bennie, Sterling Heights, MI (US); Pramita Mitra, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 17/008,526

(22) Filed: Aug. 31, 2020

(65) Prior Publication Data
US 2022/0066469 A1 Mar. 3, 2022

(51) Int. Cl.
G05D 1/02 (2020.01)
G05D 1/00 (2006.01)
(Continued)

(52) U.S. Cl.
CPC ....... *G05D 1/0295* (2013.01); *G06F 16/2379* (2019.01); *G06Q 10/06312* (2013.01);
(Continued)

(58) Field of Classification Search
None
See application file for complete search history.

(56) References Cited

U.S. PATENT DOCUMENTS

2020/0027355 A1\* 1/2020 Sujan .................... H04W 4/023
2020/0175880 A1\* 6/2020 Ibrahim ............... G08G 1/0129

FOREIGN PATENT DOCUMENTS

CN 108492550 A 9/2018
CN 109687976 A 4/2019
(Continued)

OTHER PUBLICATIONS

Hexmoor, Henry, Suray Alsamaraee and Maha Almaghshi. "BlockChain for Improved Platoon Security." (2018). (Year: 2018).\*
(Continued)

*Primary Examiner* — Maceeh Anwari
*Assistant Examiner* — Charles Pall
(74) *Attorney, Agent, or Firm* — Brandon Hicks; Eversheds Sutherland (US) LLP

(57) ABSTRACT

Systems and methods are provided herein for platooning vehicles or other types of nodes. The platooning may involve receiving a request from a vehicle to initiate a platoon. In response to the request, another vehicle may indicate a desire to form the platoon with the requesting vehicle. Before the platoon is formed, a verification process may be performed to determine the eligibility of the vehicle to join a platoon, which may be based on a rating associated with the vehicle. Once the vehicle is verified, the platoon may be established. Upon establishment, the vehicles may proceed to coordinate actions, and a lead vehicle may be identified for the platoon. Vehicles may request to join and leave the platoon throughout the lifetime of the platoon. The platoon may eventually be dismissed, for example if the lead vehicle leaves the platoon and no one vehicle is willing and/or able to serve as lead vehicle. Additionally, all of this information may be stored at a ledger through one or more blocks indicating each of the events that takes place with respect to the platoon and/or individual vehicles.

5 Claims, 5 Drawing Sheets

(51) Int. Cl.
  *G06F 16/23*    (2019.01)
  *G06Q 10/0631*  (2023.01)
  *G06Q 30/018*   (2023.01)
  *G06Q 30/0282*  (2023.01)
  *G06Q 50/30*    (2012.01)
  *G08G 1/00*     (2006.01)
  *H04W 4/40*     (2018.01)

(52) U.S. Cl.
  CPC ..... *G06Q 30/0185* (2013.01); *G06Q 30/0282* (2013.01); *G06Q 50/30* (2013.01); *G08G 1/22* (2013.01); *H04W 4/40* (2018.02)

(56) References Cited

FOREIGN PATENT DOCUMENTS

| | | | |
|---|---|---|---|
| CN | 109698754 A | 4/2019 | |
| WO | WO-2019182525 A1 * | 9/2019 | ........... G05D 1/0293 |

OTHER PUBLICATIONS

Regnath, Emanuel & Steinhorst, Sebastian. (2019). CUBA: Chained Unanimous Byzantine Agreement for Decentralized Platoon Management. 426-431. 10.23919/DATE.2019.8715047. (Year: 2019).*

Y. Ji, R. Hou, K.-S. Lui and H. Li, "A Blockchain-Based Vehicle Platoon Leader Updating Scheme," ICC 2020—2020 IEEE International Conference on Communications (ICC), 2020, pp. 1-6, doi: 10.1109/ICC40277.2020.9149388. (Year: 2020).*

* cited by examiner

SYSTEMS AND METHODS FOR VEHICLE PLATOONING

TECHNICAL FIELD

The present disclosure relates to systems and methods for platooning, and more particularly relates to managing vehicle platooning using Blockchain or other distributed ledger technologies.

BACKGROUND

Grouping vehicles into platoons may be a method of increasing the capacity of roads and reducing congestion in big cities as vehicles are grouped close together. Platoons may decrease the distances between cars using communications between vehicles (e.g., Vehicle-to-Vehicle (V2V) communications), and even possibly mechanical coupling, as in trains. This capability may allow many cars to accelerate or brake simultaneously. This system may also allow for a closer headway between vehicles by eliminating reacting distance needed for human reaction.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
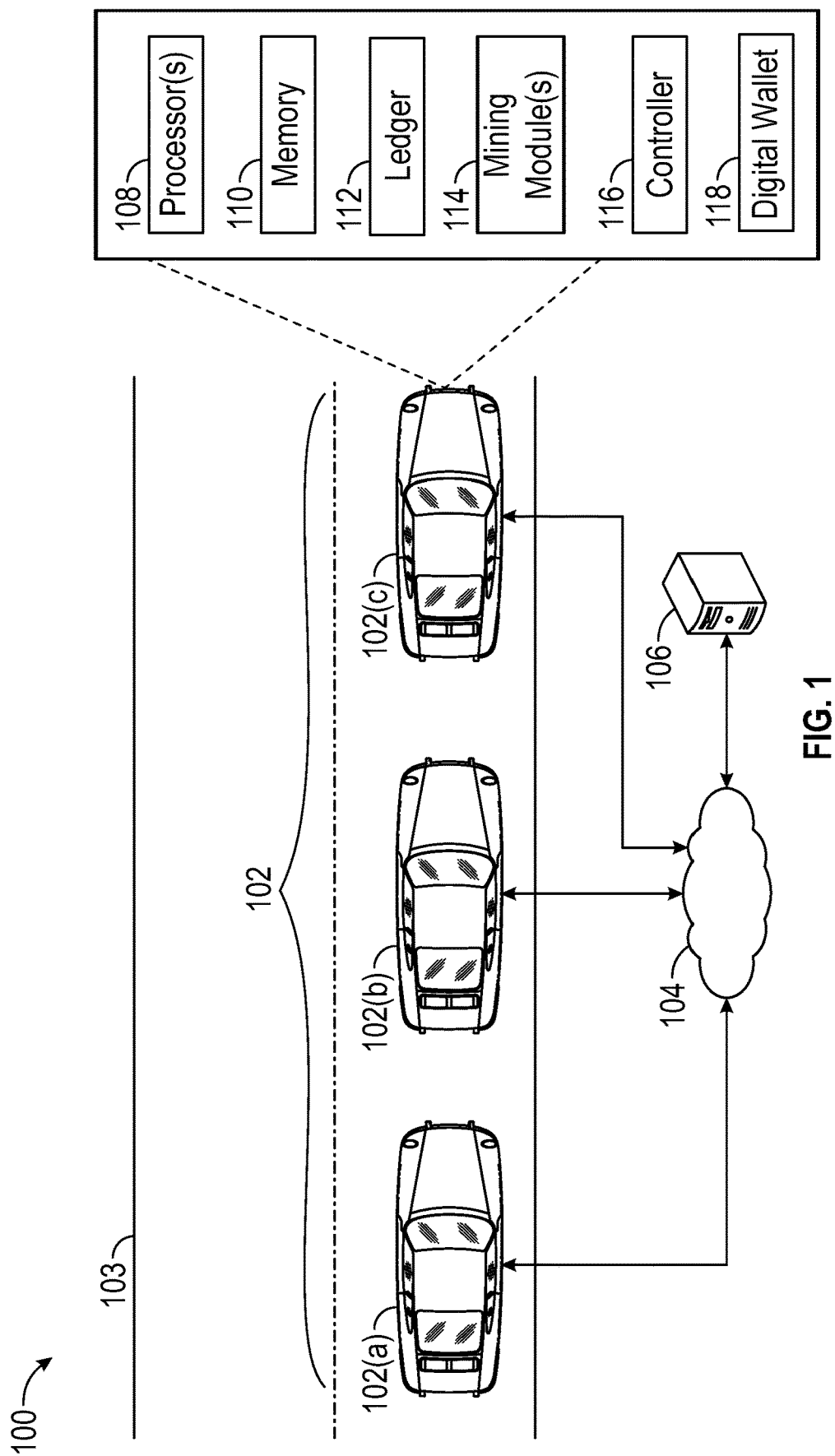
FIG. 1 depicts an illustrative platoon system, in accordance with one or more example embodiments of the disclosure.

The disclosure is directed to, among other things, systems and methods for platooning. In some instances, the disclosure is more particularly directed to vehicle platooning. Vehicle platooning may involve forming groups of one or more vehicles into a "platoon" in which vehicles coordinate actions. For example, the vehicles may physically rearrange themselves so that they may be close in proximity and may travel in a synchronized manner. Current platooning systems may face a variety of difficulties, such as absence of trust between "strange" vehicles on the road, which may increase the difficulty of vehicles joining or leaving platoons. Another example of a difficulty may include a lack of incentives for a vehicle to lead the platoon due to drag and advance communication systems that might be required. Another example of a difficulty may include limited rating or scoring systems for the vehicles to develop trust between vehicles within a platoon and to eliminate vehicles that may negatively impact the platoon. Another example of a difficulty may include a dependency on centralized fleet communication centers and cloud systems to perform platooning.

In some embodiments of the disclosure, platooning may be facilitated using Blockchain or other distributed ledger technologies (for simplicity, the use of the term "Blockchain" herein may also refer to any other distributed ledger technologies). The use of Blockchain may allow vehicles in an environment, including vehicles included within, and also external to, various platoons, to store or have access to, a ledger that includes the same or similar information. That is, each vehicle may be apprised of the same information as any other vehicle. The ledger may include for example, information about various platoons, such as platoon identifiers (e.g., the name of the platoon), time of formation, the vehicles included within the platoon, information about changes to the various platoons over time, information about individual vehicles included within and external to the various platoons, and/or any other information associated with any of the vehicles and/or platoons. The ledger may be updated (e.g., entries may be added to the ledger) based on Blockchain "transactions" or actions that take place (for example, when a platoon is initialized, the ledger may be updated to include information about the new platoon). A more detailed explanation of the ledger and/or Blockchain technology, or other distributed ledger technologies, may be found below with reference to FIG. 4.

Vehicle platooning may involve a number of processes, including at least an initialization process. The platoon initialization process may begin with a request to initiate a platoon. The request may be in the form of a Blockchain transaction, for example, and may be transmitted to, or otherwise accessible by, other vehicles. The request may also include certain identifying information, such as a location and time of the request. A number of different potential responses may be received to the request. For example, a second vehicle (or any number of other vehicles) may respond indicating that they wish to join the requesting vehicle in forming the platoon. The requesting vehicle may also not receive any responses. The requesting vehicle may also receive an indication that a platoon already exists in the environment.

In one example scenario, the second vehicle may respond with an indication of a desire to form the platoon with the requesting vehicle. The response may include information, including at least a "rating" associated with the second vehicle. The second vehicle's rating may alternatively be accessible through the ledger, or may be received from another vehicle or element (e.g., server 106, road infrastructure, etc.). In some instances, the rating may represent an aggregate value based on one or more ratings received from other vehicles included in previous platoons the second vehicle participated in. For example, the ratings provided by the other vehicles may be based on factors such as safe driving, communication, participating in evaluation processes, joining and leaving frequencies, available history, etc. The rating may be a numerical value (for example from −1 to 5), but other types of ratings values may be used as well. In this example scenario, a verification process may be performed to determine the eligibility of each of the one or more vehicles to form a platoon. In some instances, any vehicle, or any other element (for example road infrastructure, a mobile device, and/or the server 106 with respect to FIG. 1) may perform the verification. If a determination is made that the second vehicle is eligible to form a platoon based on their rating, then the platoon may be initiated. Otherwise, the second vehicle may be denied the ability to join the platoon upon formation (if multiple vehicles respond indicating intent to form the platoon, then each vehicle may be verified individually to determine if each individual vehicle is eligible to form a platoon with the requesting vehicle). This may occur, for example, if the rating of the vehicle does not meet or exceed a particular threshold value. However, any number of other methods of eligibility determination may be applicable based on the type of value that constitutes the rating. Any of this information may also be stored at the ledger in a new block (e.g., if a platoon is formed, then information about the platoon may be stored on the ledger, and if a vehicle is denied access due to eligibility reasons, then this information may also be updated on the ledger).

In a second example scenario, the requesting vehicle may not receive any responses, or may not identify any eligible vehicles. In this example scenario, the request to initiate the platoon may be dismissed or a new request may be initiated. Additionally, if the requesting vehicle determines that another platoon exists in the environment, the requesting vehicle may choose to dismiss the request and request to join the already-existing platoon.

Once a platoon is initiated, a lead vehicle for the platoon may be identified. The lead vehicle may be responsible for leading physical activities of the platoon (e.g., ensuring the platoon drives within the speed limit, drives in safe lanes and in safe road conditions, providing initial braking signals, etc.), verifying vehicles entering and/or leaving the platoon, communicating road conditions to other vehicles in the platoon, and/or maintaining an "open" status of the platoon indicating that other vehicles may join, among other responsibilities. The lead vehicle identification process may involve a request being initiated (for example from a vehicle in the platoon or any other element such as road infrastructure, the server 106 with respect to FIG. 1, etc.) for a vehicle to take over as lead vehicle of the platoon. Any of the vehicles in the platoon may respond to the request with an indication of a desire to take over as the lead vehicle. The response may include information associated with the responding vehicle, including, for example, a key that may be used to determine an eligibility of the vehicle to take over as a lead vehicle. The key may serve as an identifier for the particular vehicle, so that the information about the vehicle may be discerned (e.g., the rating described below). The eligibility of a vehicle to take over as a lead vehicle in a platoon may also be based on a rating of the vehicle. The rating of the eligibility of the vehicle to take over as lead vehicle may be similar to the aforementioned rating related to the eligibility of a vehicle to form and/or join a platoon in that it may be an aggregate of ratings provided by other vehicles. The rating for the eligibility to become a lead vehicle, however, may be different than the rating for joining and/or forming a platoon in that the rating for determining eligibility to take over as a lead vehicle may be dependent on different factors, such as factors relating to the performance of a vehicle in a lead vehicle capacity. The rating, for example, may be based on an aggregate value based on one or more ratings received from other vehicles in previous platoons the vehicle was a lead vehicle in. Once a vehicle is determined to be eligible, the vehicle may take over as the lead vehicle of the platoon. The ledger may also be updated to reflect this change to the platoon. Alternatively, instead of a request being sent for a vehicle to take over as the lead vehicle, a vehicle may simply be chosen to serve as the lead vehicle of the platoon.

Once the platoon is formed, the vehicles within the platoon (as well as vehicles outside of the platoon) may interact with the platoon in various manners. For example, a platoon, or a vehicle within a platoon, may receive a request to join the platoon from a vehicle external to the platoon. As another example, a vehicle within the platoon may request to leave the platoon.

One manner in which vehicles may interact with the platoon may include joining the platoon. The process of joining the platoon may involve an external vehicle requesting to join the platoon. The request may include information such as identifying information for the requesting vehicle, a location, a time, and a key associated with the vehicle, among other information. Upon identifying that the request has been made, verification may be performed to determine the eligibility of the external vehicle to join the platoon. This verification process may be similar to the verification process used in the initialization of the platoon (e.g., using the external vehicle's rating). Once the external vehicle has been verified, the external vehicle may be added to the platoon and the transaction of adding the external vehicle to the platoon may be published on the ledger (that is, an entry may be added to the ledger indicating that the external vehicle is now a part of the platoon). Additionally, the vehicles within the platoon may rearrange themselves to accommodate the new vehicle. The rearrangement may be based on rules associated with the platoon, or rules associated with all platoons in general. For example, a rule may entail that larger vehicles need to be located closer to the front of the platoon.

Another manner in which vehicles may interact with the platoon may include leaving the platoon. The process of leaving the platoon may involve a vehicle sending a request to leave the platoon. Based on the request, a determination may be made as to whether it is safe for the vehicle to leave the platoon (e.g., if the road conditions, arrangement of the vehicle relative to other vehicles in the platoon, etc. allows the vehicle to safely exit the platoon). Once it is determined that it is safe for the vehicle to leave the platoon, the vehicle may be notified (e.g., by the lead vehicle or any other vehicle in the platoon, as well as any external element, such as the server 106 or infrastructure) that the requesting vehicle may leave the platoon. The ledger may then be updated to reflect that the vehicle is no longer in the platoon. Additionally, one or more of the other vehicles in the platoon may rate the vehicle based on its interactions with the platoon. The ratings may impact the aggregate ratings that make up the rating value associated with the vehicle. Thus, the ratings may impact scenarios when the vehicle attempts to join subsequent platoons. Once the vehicle physically leaves the platoon, the platoon may rearrange itself if necessary. In some instances, a lead vehicle may request to leave the platoon. In this case, the lead vehicle may send a request for another vehicle in the platoon to take over as lead vehicle. If one or more of the vehicles responds indicating a desire to take over as lead vehicle, the responding vehicles may be verified for eligibility in the same or a similar manner in which the original lead vehicle was verified. If any of the responding vehicles are determined to be eligible, they may be selected to take over as lead vehicle. If no vehicles respond, or no vehicles are determined to be eligible, then a vehicle may simply be selected to serve as the lead, or the platoon may be dismissed. In either case, the ledger may be updated to reflect the change to the platoon. Further, a platoon may be dismissed in a number of other situations as well, such as voluntarily by the vehicles in the platoon when the platoon is no longer required. If all of the vehicles leave the platoon but the lead vehicle, then the platoon may be maintained and include only the lead vehicle, and the ledger may be updated to indicate that all of the other vehicles have withdrawn from the platoon.

Illustrative Embodiments

Turning now to the drawings, FIG. 1 depicts an illustrative platoon system 100 in which techniques and structures of the present disclosure may be implemented. The illustrative platoon system 100 may include a platoon 102. The platoon 102 may, for example, include one or more nodes organized into a coordinated grouping. In some instances, the plurality of nodes may include vehicles, such as vehicles 102(a), 102(b), and 102(c) (which may travel using a road system 103). The vehicles may be associated with a fleet service, a number of vehicles operating under the same ownership or control. The illustrative platoon system 100 may also include at least a communications network 104 and a server 106. In some instances, any of the elements of the platoon system 100 (e.g., vehicles 102(a), 102(b), and 102(c) and server 106) may be in communication with infrastructure (not depicted in FIG. 1). For simplicity, reference may be made to vehicles herein, but any other type of node (e.g., bike, electric scooter, etc.) may alternatively be applicable. Additionally, the terms "vehicle" and "node" may be used interchangeably.

The communications network 104 may include any one or a combination of multiple different types of networks, such as cable networks, the Internet, wireless networks, and other private and/or public networks. In some instances, the communications network 104 may include cellular, Wi-Fi, or Wi-Fi direct. In some embodiments, the network may involve communications between vehicles in the network and/or between vehicles in the network and elements external to the network. For example, Vehicle-to-Vehicle (V2V), Vehicle-to-Infrastructure (V2I), Vehicle-to-Everything (V2X), and/or Dedicated Short Range Communications (DSRC), to name a few, may be used. In some embodiments, some functionalities disclosed herein can be executed by individual vehicles (e.g., 102(a)-102(c)) and/or other nodes (e.g., user mobile phones, user wearable devices, computers, servers, etc.) in the platoon 102. In other embodiments, some functionalities disclosed herein can be executed entirely by the platoon 102 as a whole. In other embodiments, some functionalities disclosed herein can be executed cooperatively by individual vehicles and the platoon 102 as a whole. In other embodiments, some functionalities disclosed herein can be executed by an external source, such as server 106 and/or infrastructure (not depicted in FIG. 1).

In various embodiments, each of the vehicles (e.g., 102(a)-102(c)) of the platoon 102 may be configured similarly. For brevity, a single vehicle, such as vehicle 102(a) may be discussed in greater detail, but any discussion with respect to a single vehicle may similarly apply to any other vehicle, such as vehicle 102(b) and/or vehicle 102(c), for example. In general, the vehicle 102(a) comprises at least one or more processor(s) 108, memory 110, a ledger 112, one or more mining module(s) 114, a controller 116, and/or a digital wallet 118.

In some embodiments, vehicle 102(a) may include one or more processors 108 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 110 as needed for execution. The processor 108 may be configured to execute the computer-executable instructions to cause various operations to be performed. Each processor 108 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The memory 110 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 110 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The ledger 112 may be a decentralized and distributed information source that may be continuously updated, distributed, and/or stored at vehicle 102(a), for example. All other nodes in the platoon 102 (as well as vehicles external to the platoon 102) may also have access to and/or have stored a similar ledger 112 so that all vehicles (e.g., vehicles 102(a)-102(c)) may be apprised of the same ledger information at any given time. For example, the ledger 112 may include information about a platoon 102, any transactions that have taken place with respect to the platoon 102, the vehicles within the platoon (e.g., 102(a)-102(c)) or any other vehicle, and also any other relevant information for the operation of the platoon 102 or any vehicles. The contents of the ledger may be separated into various blocks including such transactional information. In some instances, the blocks may form parts of a Blockchain, and may indicate a history of transactions that have taken place. That is, observing the various blocks included within the Blockchain on the ledger, it is possible to determine a behavioral history of various vehicles and/or platoons that exist or have existed.

The mining module(s) 114 may allow the vehicle 102(a) (or any other node type, such as road infrastructure, mobile devices, servers, such as server 106, etc.) to perform mining operations. The mining operations may serve to validate transactions that are registered before they are saved to the ledger. This may ensure that no illegitimate transactions or blocks are added to the Blockchain on the ledger 112.

The controller 116 may allow the vehicle to perform certain functions. For example, the vehicle may receive, from a first node, a request to initiate a first platoon of nodes. The controller 116 may also receive, from a second node, a response to the request, the response indicating an agreement to initiate the first platoon with the first node. The controller 116 may also determine, from a ledger and in response to receiving the response from the second node, a rating associated with the second node, the rating being representative of feedback provided about the second node. The controller 116 may also determine that the rating associated with the second node meets an eligibility criteria. The controller 116 may also establish, based on the determination that the rating associated with the second node meets an eligibility criteria, the first platoon including the first node and the second node. The controller 116 may also save information about the first platoon to the ledger. The controller 116 may also perform any of the other functions described herein.

The digital wallet 118 may serve as a digital storage location for various types of information associated with the vehicle 102(a). For example, the digital wallet 118 may store information such as payment cards (for example, used to facilitate payments between vehicles and other elements), identification information, the key(s) associated with the vehicle 102(a), a history of data being exchanged, etc. The key(s) may be private or public keys and may serve as identifiers for the vehicle 102(a).

Server 106 may serve as an internal or external data source for any of the vehicles (e.g., vehicle 102(a)). The server 106 may also be capable of remotely performing the functionality performed by the vehicle controller 116.

Figure 2:
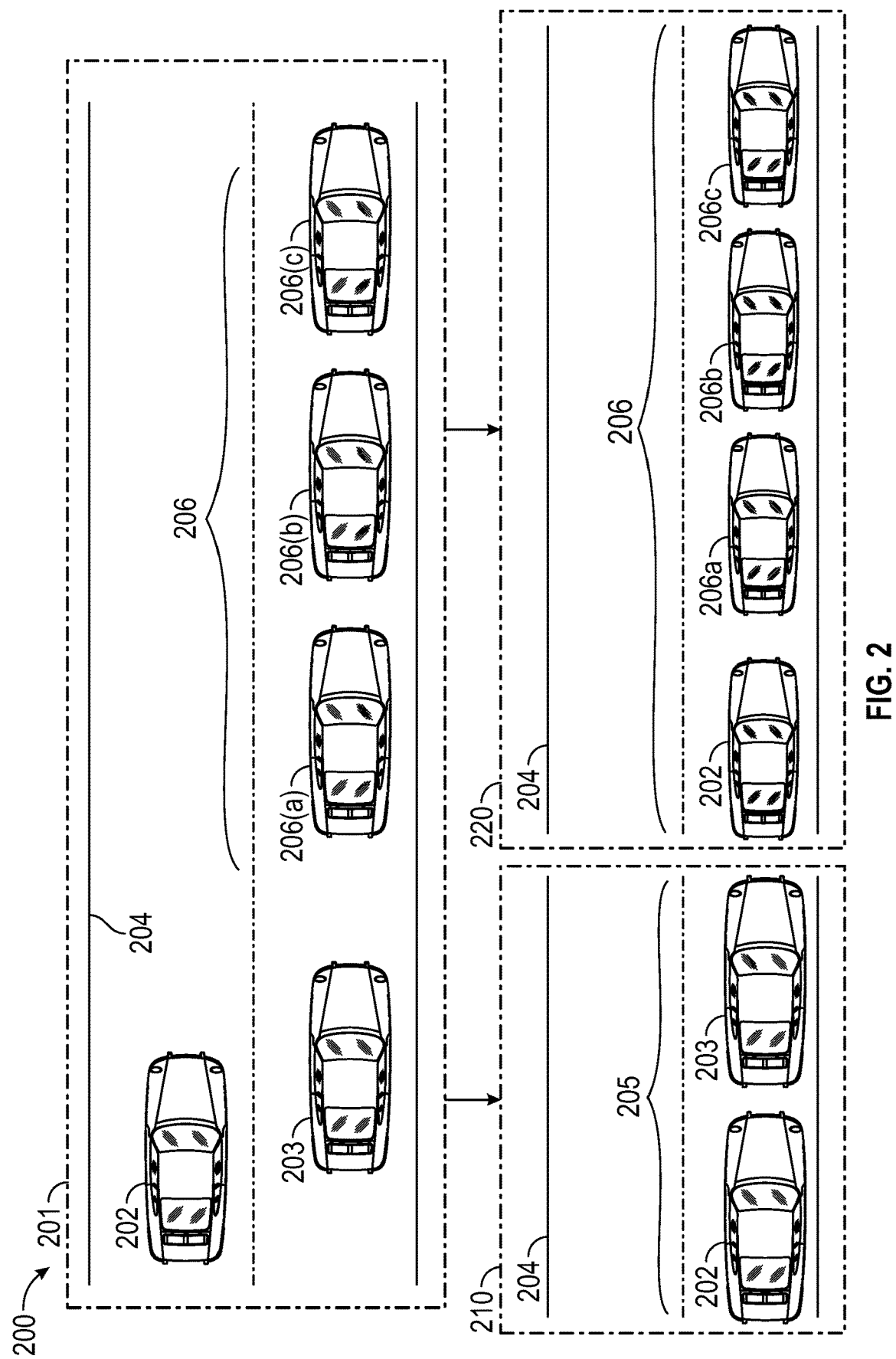
FIG. 2 depicts a platoon use case, in accordance with one or more example embodiments of the disclosure.

FIG. 2 depicts a platoon use case 200. For example, FIG. 2 may depict a use case 200 in which a platoon is formed by a vehicle 202 (which may be the same as vehicle 102(a) with reference to FIG. 1). For example, 201 may depict the vehicle 202 traveling on a road 204 with another vehicle 203 as well as an already-existing platoon 206 including vehicles 206(a)-(c). The use case 200 may entail the vehicle 202 requesting a platoon at a first location at a first time. The request may be in the form of a Blockchain transaction that may be recorded in a block on the ledger.

Once the request has been initiated, a number of potential response scenarios may arise. For example, in a first response scenario, no "positive" responses may be received. A positive response may be in the form of a message that another vehicle (e.g., vehicle 203 or any of the vehicles in platoon 206) on the road 204 wishes to initiate the platoon with the vehicle 202. This scenario may entail that either no eligible vehicles are located within a sufficient distance from vehicle 202 to provide a response, that eligible vehicles are located within a sufficient distance but choose not to provide a response, or that vehicles may be present, but are not eligible to join a platoon.

A vehicle's eligibility to join a platoon may be based on a rating associated with the vehicle. The rating may represent an aggregate value based on one or more ratings received from other vehicles included in previous platoons the vehicle participated in. For example, the ratings provided by the other vehicles may be based on factors such as safe driving, communication, participating in evaluation processes, joining and leaving frequencies, available history, etc. The rating may be a numerical value (for example from −1 to 5), but other types of rating values may be used as well. In some instances, any vehicle, or any other element (for example road infrastructure, a mobile device, and/or the server 106 with respect to FIG. 1) may perform the verification.

In a first response scenario, it may be determined that no responses have been received or that no responses for eligible vehicles have been received. In this scenario, the vehicle 202 may leverage a timeout to dismiss the request. The vehicle 202 may also initiate a new request to form a platoon. The new request may again be at the same location at a second time, or may be at a second location at a second time (for example, if the vehicle was not stationary during the first platoon request and is now located at the second location). The vehicle 202 may also maintain the request (instead of dismissing the request and/or initiating a new request) and continue to wait for a positive response.

In a second response scenario, the vehicle 202 may receive a positive response from another vehicle on the road 204. The positive response may be an indicator that the other vehicle (e.g., vehicle 203) desires to form a platoon with the vehicle 202. In some cases, positive responses may be received from multiple other vehicles, such that the initialization of the platoon may not be limited to just two total vehicles. The request may also be maintained even after one or more positive responses have been received. For example, the platoon may not be initiated until a period of time after the first positive response was received to allow other vehicles to indicate a desire to join the platoon. In some instances, the length of time the request is maintained may also be based on other factors, such as the number of positive responses received, or the rate at which positive responses are received. Once the positive response is received and the vehicle 203 (and any other vehicles not shown in FIG. 2) is verified as an eligible vehicle, then a platoon 205 may be initialized as shown in 210. The platoon 205 may now include the original requesting vehicle 202 as well as the vehicle 203 that indicated a desire to join the vehicle 202. Upon the formation of the platoon 205, the ledger may be updated with a block including the completed platoon formation transaction. The block may include information such as, for example, the name of the platoon (or another platoon identifier), the location of the platoon 205, the time of formation, and a list of vehicles included within the platoon 205. The block may also include information about which of the vehicles is the lead vehicle of the platoon 205 (as described in more detail below). In some instances, the ledger may already contain information about the other already-existing platoon 206 as shown in 201. Thus, the ledger may now include information both about platoon 205 and platoon 206.

In a third response scenario, it may be determined that a platoon (e.g., platoon 206 including vehicles 206(a)-206(c)) already exists in the first location. In this scenario the vehicle 202 may dismiss the platoon initialization request transaction and request to join the pre-existing platoon 206 as shown in 220. Alternatively, the vehicle 202 may maintain the platoon initialization request in an effort to form a separate platoon from platoon 206.

Once a platoon is formed, a platoon leader may be identified. The platoon leader may include one of the vehicles within the platoon, and may be responsible for leading physical activities of the platoon (e.g., ensuring the platoon drives within the speed limit, drives in safe lanes and in safe road conditions, providing initial braking signals, etc.), verifying vehicles entering and/or leaving the platoon, communicating road conditions to other vehicles in the platoon, and/or maintaining an "open" status of the platoon indicating that other vehicles may join, among other responsibilities. The platoon leader identification process may involve one of the vehicles within the platoon sending a request for a vehicle to take over position as the platoon leader. The request may be sent to some or all of the vehicles within the platoon. Once the platoon leader request has been sent, a number of potential response scenarios may arise. In a first response scenario, no positive responses are received from any of the vehicles in the platoon (for example, if no vehicles in the platoon indicate that they are willing to assume the role of platoon leader). In this scenario, the request may remain active or the vehicle that initiated the first request may send a second request asking for a leader. In a second response scenario, one or more vehicles in the platoon may respond with a message indicating that they are willing to assume responsibility as platoon lead. The response message may include a "key" associated with the vehicle. The key may be used by one or more other vehicles within the platoon (or any other entity such as infrastructure, drones, pedestrian smart devices, etc.) to determine if the vehicle is eligible to assume the role as lead of the platoon. For example, eligibility may be based on a rating associated with the vehicle. The rating may be an aggregate value based on one or more ratings received from other vehicles in previous platoons the vehicle participated in. In the context of a decision as to whether a vehicle should serve as a platoon lead, the ratings may be based on previous situations in which the vehicle was a platoon lead. For example, the ratings may be based on factors such as driving management, user experience, quality of communications, etc. In some instances, the ratings may be a numerical value (for example from −1 to 5), but other types of rating values may be used as well. If the eligibility of the vehicle is confirmed, the vehicle becomes the lead of the platoon. This information may then be updated in the ledger to indicate that the vehicle is now the lead of the platoon. This update may be in the form of a new block that includes all of the information in the previous block regarding the platoon with the addition of an indication that the vehicle is now the platoon lead.

In some instances, vehicles (or any of the other listed entities) that perform eligibility determinations may be provided with compensation for performing these determinations. For example, for each robust evaluation the cost-rewards values can be represented as the following functions, $Y_i$ and $Y$ respectively (where $Y_i$ may be a joint vehicle cost or payment and $Y$ may be a lead returned or gain).

$$Y_i = \frac{w1 * nodei_{Time} + w2 * node_{Miles} + w3 * node_{Type} + w4 * \text{Location} + w5 * \text{Time} + .. + wn * \text{factor}_n}{\text{Number of Nodes}}$$

$$Y^{\square} = \sum_{k=0}^{n} Y_i$$

w1, w2, ..., wn may represent weight factors that may calibrated and defined for fare rate and return to all parties and can be adjusted. $\text{Node}_{Time}$, $\text{node}_{Miles}$, and $\text{node}_{Type}$ may represent the amount of time the node was in the platoon, the distance the node traveled with the platoon, and the type of vehicle (small, medium, SUV, etc.). Other factors, such as environmental conditions or gas cost, among others, may be added to the above-mentioned functions.

Once a platoon is established (for example, through the use case 200 with respect to FIG. 2), the platoon may receive requests to join the platoon from vehicles that are external to the platoon. The platoon itself may also send requests to external vehicles to join the platoon. Additionally, the same may be applicable to more than one vehicle (for example, an entire external platoon may request to merge with the platoon, or vice versa). Once the request is sent and/or received, some or all of the external vehicles may be verified by one or more of the vehicles in the platoon to determine their eligibility to join. In some instances, the verification process may be similar to, or the same as, the process for determining eligibility used during the platoon initialization process (e.g., based on the rating of the vehicle). If the external vehicle is positively verified by one or more of the vehicles in the platoon, then the vehicle may be added to the platoon. If, however, the external vehicle is not positively verified by any of the vehicles in the platoon, then the external vehicle may be denied access to the platoon. Once the vehicle is denied access, the ledger may be updated to reflect that the vehicle was denied access.

Additionally, once the vehicle is added to the platoon, one or more updates may be made to the platoon itself and/or the ledger. One update may involve an update to the ledger to reflect that the vehicle is now included in the platoon. For example, a new block may be added to the ledger that lists the newly added vehicle as one of the vehicles in the platoon. Another update may involve a physical rearrangement of the vehicles in the platoon. In some instances, when one or more vehicles are added to a platoon, each of the added vehicles may identify itself and follow protocol rules to take a suitable platoon arrangement. For example, the platoon arrangement may be based on the size of the vehicles. In one example arrangement, trucks may be located first, then pickup trucks and SUVs, then large size cars, medium cars, small cars, and motor cycles. Any number of other arrangement types based on any number of other factors may be possible, however. Such arrangement rules may be defined for optimal safety conditions and fuel consumption.

Figure 3:
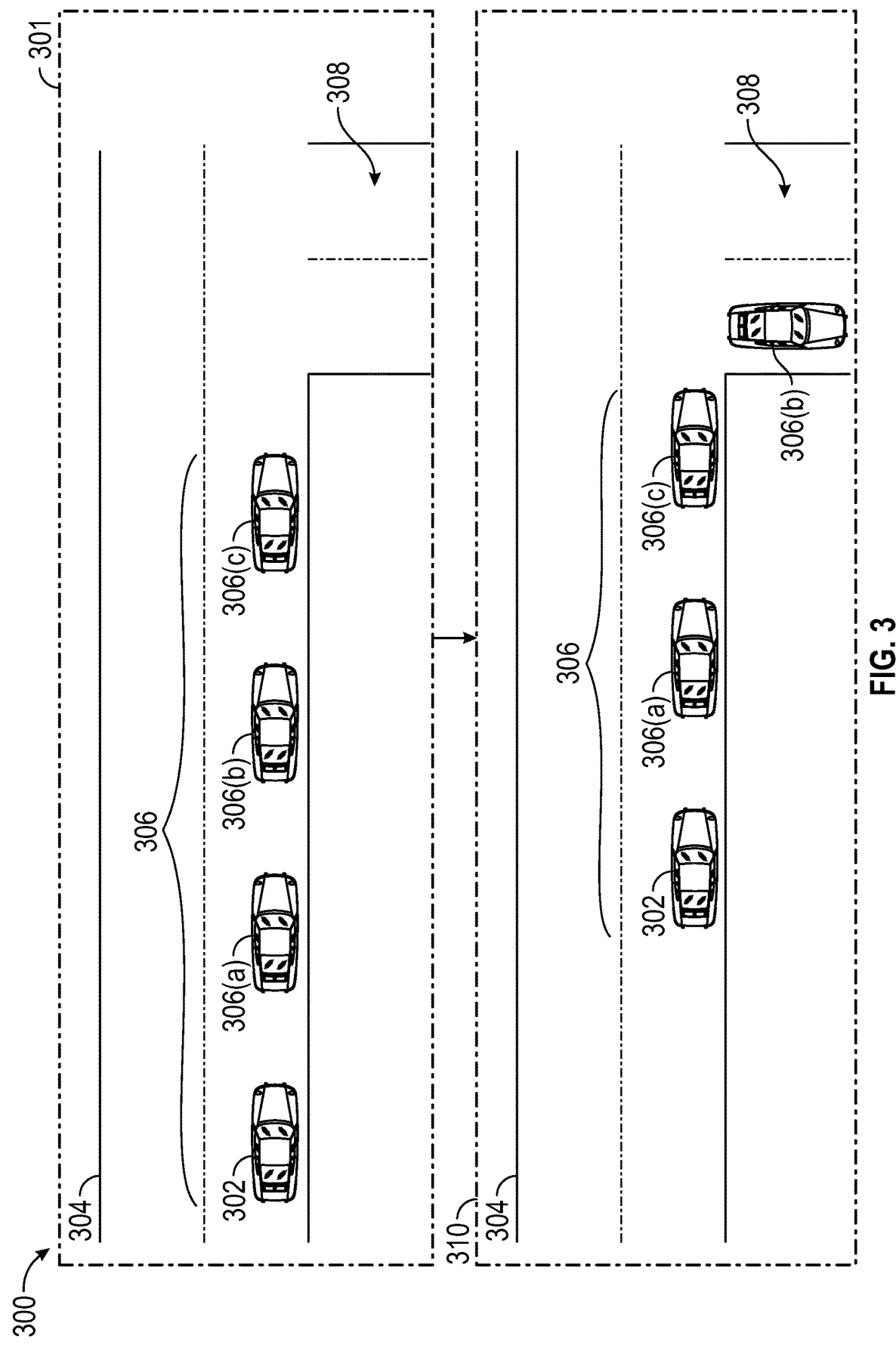
FIG. 3 depicts a platoon use case, in accordance with one or more example embodiments of the disclosure.

FIG. 3 depicts another platoon use case 300. The use case 300 may involve a vehicle leaving the platoon (for example, in this case vehicle 306(b) may be seen as a member of platoon 306 in 301, but leaving the platoon 306 at 310 to turn off onto side road 308). The process of a vehicle leaving the platoon may involve the vehicle sending a communication to one or more of the other vehicles in the platoon. The communication may include a request to leave the platoon, among other information such as, for example, the vehicle's key, a location, a time, etc. For example, the location and time may represent the location and time at which the vehicle wishes to leave the platoon. The communication may also include a request to update the ledger to indicate that the vehicle will no longer be listed in the platoon (in some cases, the vehicle can simply provide the ledger update itself).

In some instances, a determination may be made as to whether it is safe for the vehicle to leave the platoon. This determination may be made by a vehicle in the platoon, a vehicle external to the platoon, or any other external element (e.g., road infrastructure). Once it is determined that it is safe for the vehicle to leave the platoon, an indication may be provided to the vehicle that the vehicle is able to safely leave. At this point, the vehicle leaving the platoon may evaluate and rate the current (as well as any past) lead vehicle of the platoon (this may also happen before or after leaving the platoon). Once the lead (or other vehicles) indicates that the vehicle is able to leave the platoon, the other vehicles in the platoon may take action to allow the vehicle to leave the platoon. For example, such action may involve re-arranging the vehicle so as to allow the vehicle to navigate the platoon and/or road to its desired destination. Once the vehicle leaves, the transaction may be saved to the ledger to indicate that the vehicle is no longer in the platoon. This ledger entry may also indicate any changes that were made to the platoon in addition to the removal of the vehicle that left. For example, if any of the vehicles in the platoon rearranged their orientation based on the vehicle leaving. Further, in some instances, the vehicle leaving the platoon may be the lead vehicle. If the leaving vehicle is the lead vehicle, then the request also includes an inquiry as to whether any of the vehicles in the platoon can and will take over as the lead vehicle. The process used to identify a new lead may involve the same process as described with reference to FIG. 2 to identify the original platoon lead. Once a new platoon lead is identified and verified, the new platoon lead may be reflected in the ledger. At this point (or even before this point), the original platoon lead may leave the platoon. This may involve some or all of the processes as if the vehicle were not the lead and leaving the platoon.

In some instances, a platoon may need to be dismissed or ended. For example, a platoon may be dismissed if a lead vehicle requests to leave the platoon and no other vehicles within the platoon are willing and/or eligible to take over as the lead vehicle of the platoon. As another example, a platoon may be dismissed if all vehicles included in the platoon leave the platoon. Any number of other scenarios in which a platoon may be dismissed are also possible. The process of dismissing the platoon may involve updating the ledger to indicate that the platoon has no lead and that the platoon has been dismissed. In some instances, if the vehicles and the lead are still remaining in the platoon when it is dismissed, then the update to the ledger may maintain the vehicle lead but indicate that all of the other vehicles withdrew from the platoon. In other instances, the entire platoon may simply be dismissed, including the lead.

Figure 4:
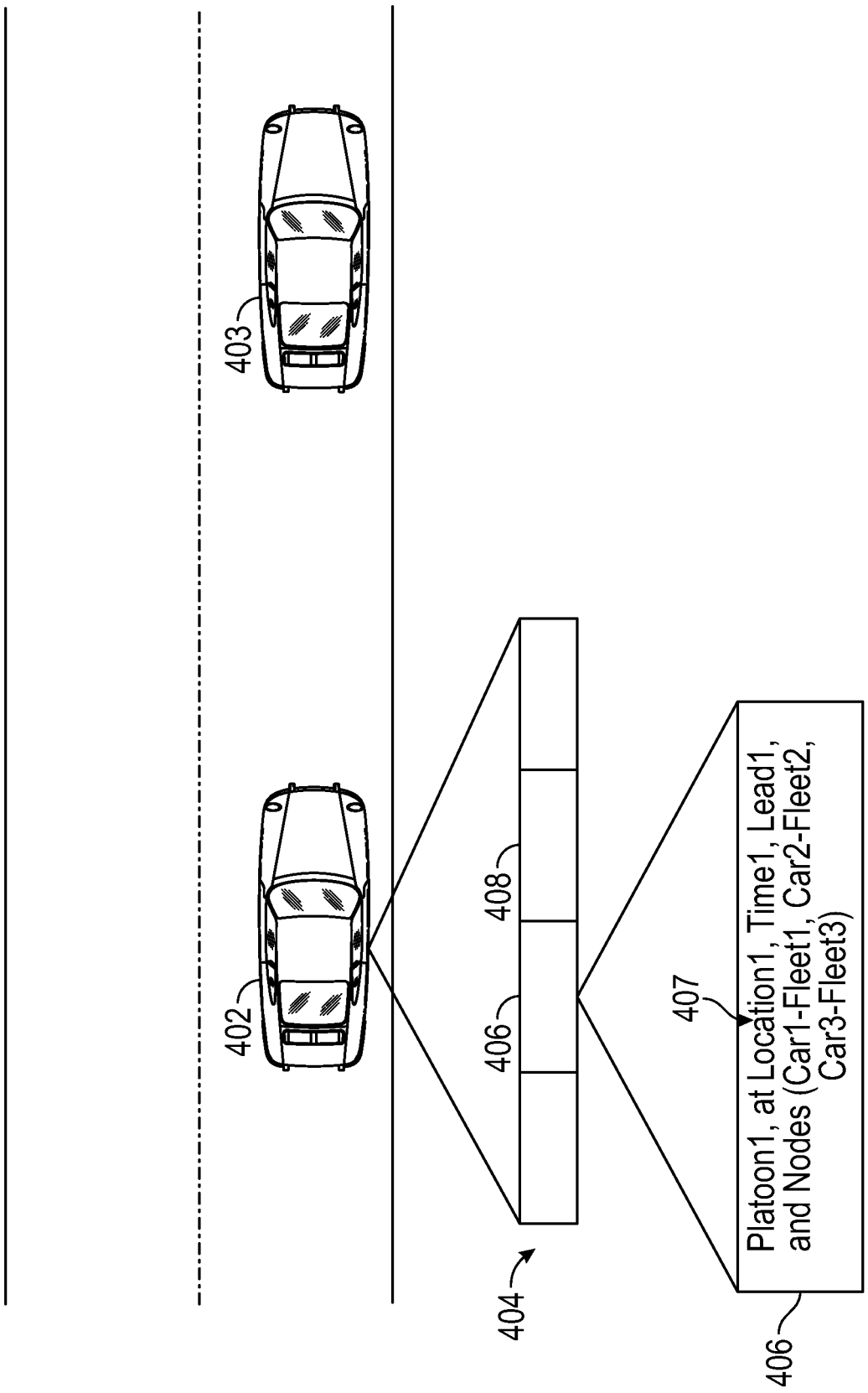
FIG. 4 depicts an exemplary ledger, in accordance with one or more example embodiments of the disclosure.

FIG. 4 depicts an exemplary ledger that may be stored at, or otherwise accessible by, a vehicle. In some instances, a vehicle (e.g., vehicle 402), including vehicles found within a platoon and/or vehicles separate from a platoon, may have stored or may otherwise have access to, a ledger 404. That is, each vehicle may have access to the same information as other vehicles through the ledger 404, which may be distributed to all of the vehicles. Any time the ledger 404 is updated, the updates may also be distributed to all of the vehicles. The ledger 404 may include information about all vehicle transactions that have taken place, including any past and/or present transactions involving various platoons, vehicles included within these platoons, and any independent vehicles not included in a platoon. Thus, the ledger 404 may include a running history of any platoons and/or vehicles. The ledger 404 may include one or more blocks (e.g., block 406 and block 408), each of which may represent a particular ledger update, or transaction, and the combination of which form a Blockchain. For example, a block 406 may be stored to the ledger upon initialization of a platoon. The block 406 may include information 407. In this particular example, the information may include a platoon identifier, a location, a time, an identity of a lead vehicle, and a listing of vehicles included within the platoon. This block 406 and the information 407 included within the block may be stored or otherwise accessible by any number of vehicles, such as vehicle 403. Each block may represent either a single transaction (e.g., a vehicle joining a platoon) or multiple transactions. That is, by viewing the blocks that comprise the Blockchain, a behavioral history of a vehicle and/or multiple vehicles included in a platoon may be observable.

Figure 5:
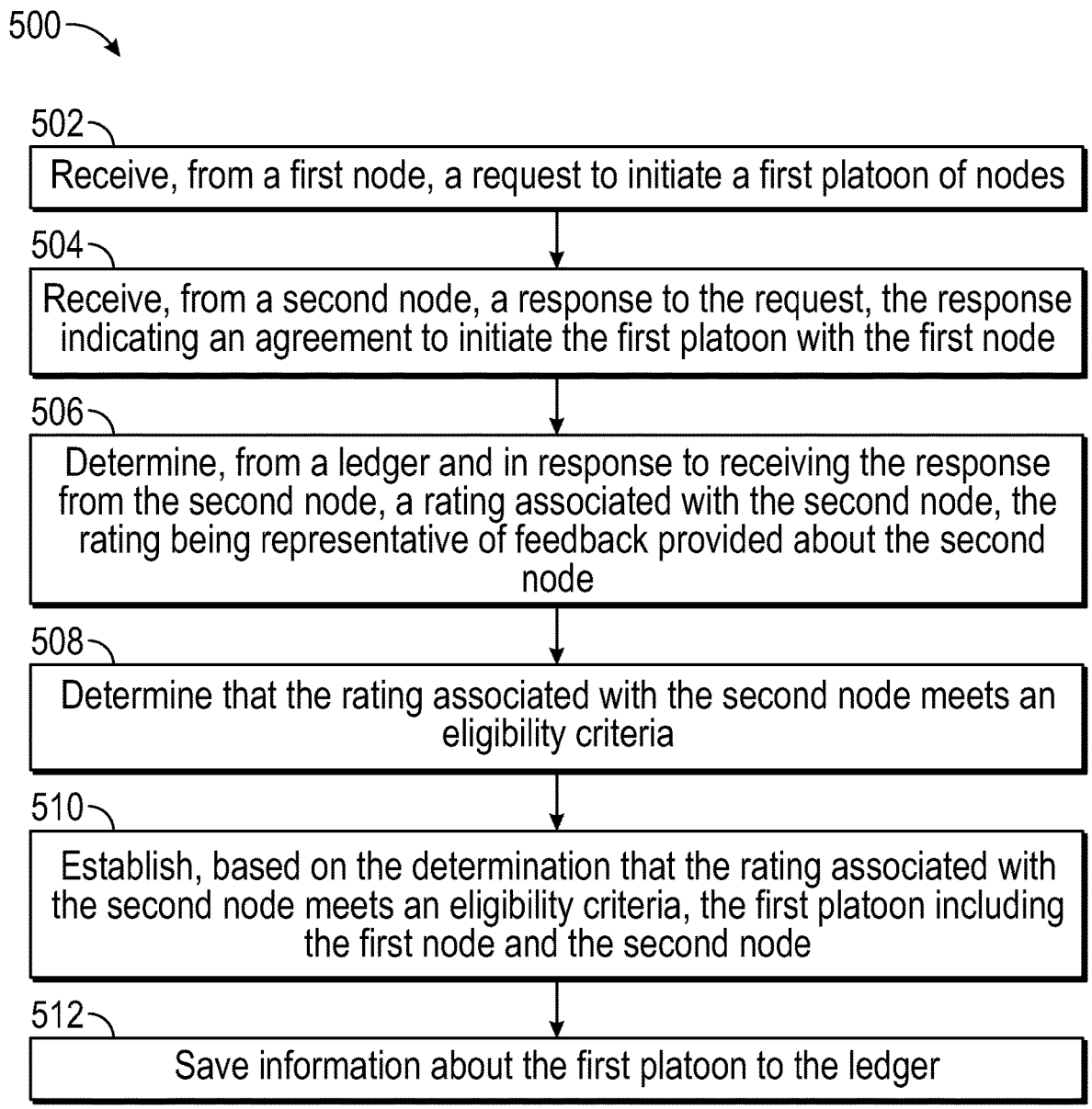
FIG. 5 depicts a flowchart of an example method, in accordance with one or more example embodiments of the disclosure.

FIG. 5 is a flow of an example method of the present disclosure. In some embodiments, the method includes a step 502 of receiving, from a first node, a request to initiate a first platoon of nodes. The request may include information associated with the node, such as a node identifier, a key, a location, and a time. A platoon of nodes may be a coordinated grouping of nodes that travel in a synchronized manner, which may promote road travel efficiency.

In some embodiments, the method includes a step 504 of receiving, from a second node, a response to the request, the response indicating an agreement to initiate the first platoon with the first node. For example, another vehicle on the road may identify the request to initiate a platoon, and may indicate a desire to form the platoon with the requesting node.

In some embodiments, the method includes a step 506 of determining, from a ledger and in response to receiving the response from the second node, a rating associated with the second node, the rating being representative of feedback provided about the second node. That is, once it is determined that the second node wishes to initiate the platoon with the first node, then the eligibility of the second node to join platoons is determined. Eligibility determinations may be performed to ensure that a platoon is not formed with a node that is associated with a history of behaviors that might negatively impact a platoon and its functionality.

In some embodiments, the method includes a step 508 of determining that the rating associated with the second node meets an eligibility criteria. In some instances, the rating associated with the vehicle may be an integer value within a certain range (e.g., −1 to 5). However, the rating may be any other value, such as a string, Boolean, or any other value capable of representing a rating of the vehicle. The eligibility criteria may be based on the type of value. For example, if the rating is an integer between −1 and 5, then the eligibility criteria may be based on the rating being above a threshold rating.

In some embodiments, the method includes a step 510 of establishing, based on the determination that the rating associated with the second node meets an eligibility criteria, the first platoon including the first node and the second node. Establishing the first platoon may entail the first and second nodes (e.g., vehicles) rearranging their physical positioning relative to one another so that they may move in a synchronized manner. The rearrangement may also be based on particular rules associated with the platoon. One rule, for example, may provide that larger nodes are required to be closer to the front of the platoon relative to smaller nodes. The nodes may also begin performing various communications with one another to coordinate synchronized actions, such as traveling at a certain speed, or making a coordinated left turn. Additionally, a node may be selected as the lead node for the platoon. The lead node of the platoon may be responsible for leading physical activities of the platoon (e.g., ensuring the platoon drives within the speed limit, drives in safe lanes and in safe road conditions, providing initial braking signals, etc.), verifying vehicles entering and/or leaving the platoon, communicating road conditions to other vehicles in the platoon, and/or maintaining an "open" status of the platoon indicating that other vehicles may join, among other responsibilities. Further, after the platoon is formed, other nodes may be allowed to join the platoon based on eligibility criteria (which may be the same as the criteria used to initiate the platoon) and nodes may leave the platoon.

In some embodiments, the method includes a step 512 of saving information about the first platoon to the ledger. The information may include, for example, a node identifier, information about the nodes included within the platoon, a time and location the platoon was initiated, etc. The information may be saved as a block on the ledger, which may be a block on a Blockchain. Additionally, anytime a change is made with respect to the platoon, the ledger may be updated with additional blocks to indicate such changes (e.g., if a node were to join the platoon). That is, the ledger may include a running history of the platoon and vehicles associated with the platoon.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
a processor; and
a memory storing computer-executable instructions that, when executed by the processor, cause the processor to:
generate, by a first node, a request to initiate a first platoon of nodes;
receive, from the first node, the request;

receive, from a second node, a response to the request, the response indicating an agreement to initiate the first platoon with the first node;

obtain, from a ledger, a block associated with a previous platoon that the second node participated in;

determine, by the first node, and in response to receiving the response from the second node, a rating stored in the block, wherein the rating is associated with the second node, the rating being representative of feedback provided about the second node from the previous platoon that the second node participated in;

determine that the rating associated with the second node meets an eligibility criteria;

contingent upon the rating stored in the block obtained from the ledger indicating that the second node meets an eligibility criteria, establish the first platoon including the first node and the second node;

save, by the first node or the second node, information about the first platoon to the ledger;

receive, from a node of the first platoon, a request to leave the first platoon;

update the ledger to remove the node that indicated intent to leave the first platoon; and send a communication to the nodes in the first platoon to rearrange a positioning of the nodes in the first platoon so that the node that indicated intent to leave the first platoon is able to leave the first platoon, wherein the first node is a first vehicle, the second node is a second vehicle, and the first platoon comprises a group of vehicles that travel in a synchronized manner, and wherein the synchronized manner comprises at least one of (a-1) a synchronized speed of travel and (a-2) a synchronized direction of travel and at least one of (b-1) a fuel-efficient manner of travel and (b-2) communication of road conditions among the group of vehicles.

2. The system of claim 1, wherein the computer-executable instructions further cause the processor to:

receive, from a third node, a request to join the first platoon;

determine that a rating associated with the third node does not meet the eligibility criteria, wherein the rating associated with the third node is retrieved from the ledger; and reject, based on the determination that the rating associated with the third node does not meet the eligibility criteria, the third node from joining the first platoon.

3. The system of claim 1, wherein the computer-executable instructions further cause the processor to:

receive a request that a node of the first platoon serve as a lead node;

receive, from a node of the first platoon, an indication of an intent to serve as the lead node;

determine that the node intending to serve as the lead node is eligible to serve as the lead node; and update the ledger to indicate that the node intending to serve as the lead node of the first platoon is the lead node of the first platoon.

4. The system of claim 1, wherein the computer-executable instructions further cause the processor to:

determine that the node that indicated intent to leave the first platoon is a lead node in the first platoon;

send a request for a node in the first platoon to take over as the lead node;

receive a response from a node in the first platoon, the response indicating intent to take over as the lead node;

verify that the node is eligible to take over as the lead node; and update the ledger to indicate that the node is now the lead node for the first platoon.

5. The system of claim 1, wherein the computer-executable instructions further cause the processor to:

determine that the node that indicated intent to leave the first platoon is a lead node in the first platoon;

send a request for a node in the first platoon to take over as the lead node;

determine that no response has been received from a node in the first platoon; and update, based on the determination that no response has been received, the ledger to indicate that the first platoon has been disbanded.

* * * * *